United States Patent Office.

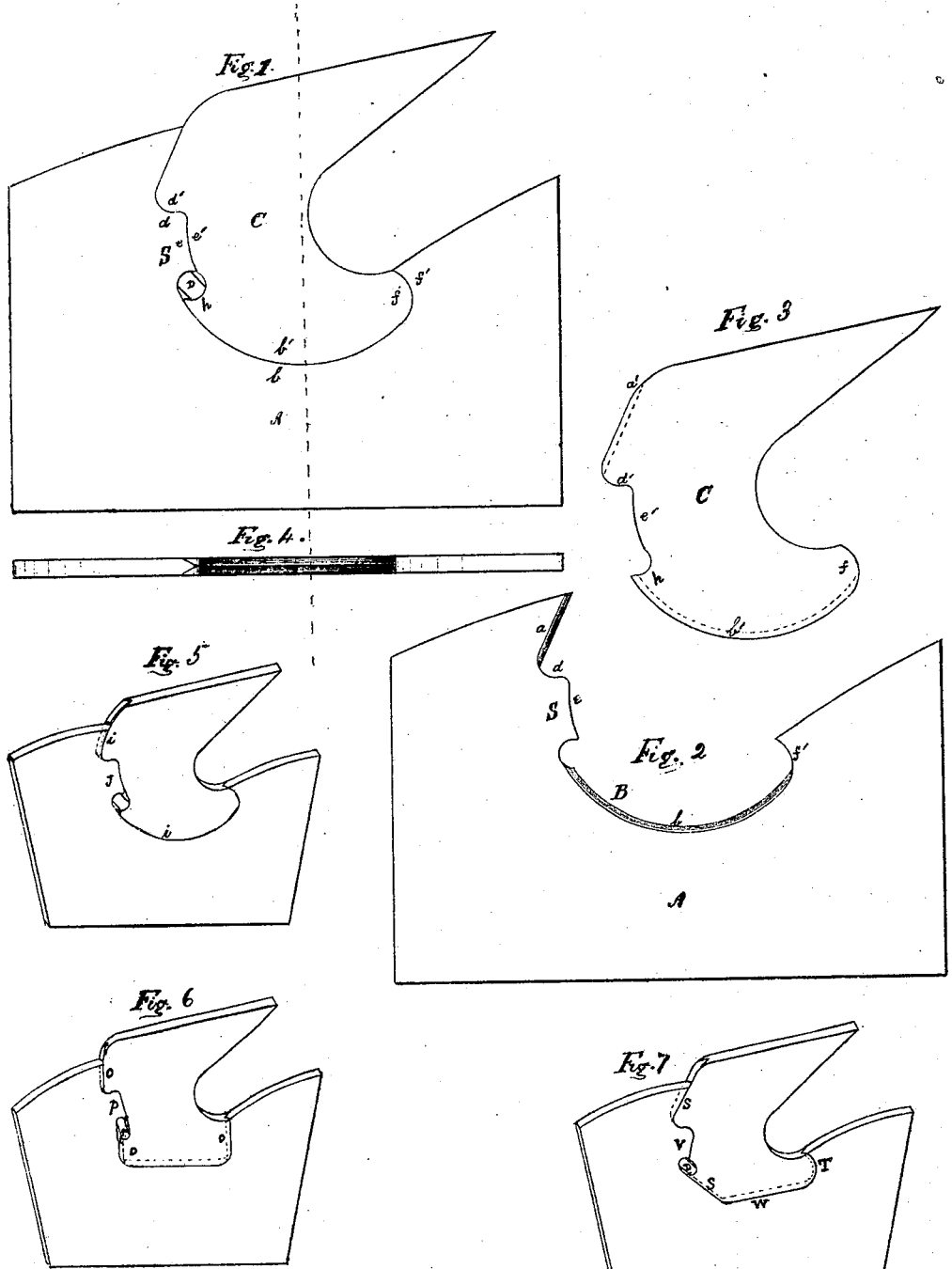

WILLIAM E. BROOKE, OF TRENTON, NEW JERSEY, ASSIGNOR TO HIMSELF AND WILLIAM H. IVENS, OF SAME PLACE.

Letters Patent No. 107,593, dated September 20, 1870.

IMPROVEMENT IN SAWS.

The Schedule referred to in these Letters Patent and making part of the same

*To all whom it may concern:*

Be it known that I, WILLIAM E. BROOKE, of Trenton, in the county of Mercer, in the State of New Jersey, have invented certain Improvements in Saws, of which the following is a specification.

The object of this invention is to improve upon the present mode of inserting teeth in the plate of a saw, and in such a manner as to hold it securely, without straining the edge or rim of the blade or plate in which it is inserted.

In the drawings—

Figure 1 is a view of a section of saw-plate with a tooth inserted.

Figure 2 is a section of saw-plate, showing the recess.

Figure 3 is a side view of the tooth.

Figure 4 is an edge view of saw-plate, showing recess.

Figure 5 is a perspective view of a section of saw-plate, with a tooth inserted on circular levers.

Figure 6 is a perspective view of a section of saw-plate, with a tooth inserted in straight lines parallel to each other.

Figure 7 is a perspective view of a section of saw-plate, with saw-teeth set in straight lines angular to each other, with circular forward shank on tooth.

A is the saw-blade or plate.

B, in fig. 2, the recess cut into the saw-plate to receive the body of the tooth C. This recess has a straight side, a projection or tongue, a circular base and side.

The side $a$ and base $b$ in fig. 2 have projecting ribs that fit into V-shaped grooves, $a'$ and $b'$, on the side and bottom of tooth C.

The sides $d$ and $e$ of the projection S, in the recess B and $d$ and $e$ of the tooth, are plane surfaces, having neither groove or ribs. This projection answers a double purpose, that of forming a shoulder to draw the tooth against, and to hold it securely without stretching the rim of the plate, at the same time forming an abutting surface that better resists the shock of the hammer in swaging the point of the tooth, and the thrust of the tooth in its work, than if the parts receiving such force were tongued and grooved, which is liable to give way and allow the tooth to become loose in the plate.

The tooth is put into the recess by placing the forward part or shank $f$ against $f'$ in recess, which acts as a pivot on which the tooth is turned into its place, and held securely by the key or elongated rivet D, which draws the tooth to its bearings, all the strain being on the projection S and within the tooth C at $d$ and $h$, thus effectually preventing the stretching of the rim of the plate.

Figs. 5, 6, and 7 are three of the many shapes that teeth may be inserted and held securely in the blade or plate, as shown in drawings.

Fig. 5 shows a tooth inserted on circular lines $i\ i$, being tongued and grooved all around, except at projection J, which is plane, as in fig. 1 at $d\ e$.

Fig. 6 shows a tooth inserted in straight lines, sides $o\ o\ o$ being parallel to each other, and tongued and grooved, and held securely by a plane projection $p$ and rivet $r$.

Fig. 7 shows a tooth inserted, with three straight sides and a circular end on the forward shank of the tooth, which acts as a pivot to swing the tooth to its place.

The sides $s\ s$ and circular end T are tongued and grooved, while the projection $v$ and base $w$ are plane, having no tongue or groove. This tooth is held securely by the projection and key or rivet D, so that there is no possible danger of its getting loose or flying out while at work.

Having fully described my invention,

What I claim, and wish to secure by Letters Patent, is—

The projection S in the recess B in the saw-plate A, in combination with a corresponding recess in the tooth C, substantially as shown and described.

WILLIAM E. BROOKE.

Witnesses:
RICHARD A. DONNELLY,
CHARLES E. HARPER.